July 23, 1963 W. J. MEANS 3,098,997

INFORMATION STORAGE ARRANGEMENT

Filed May 28, 1959

INVENTOR
W. J. MEANS
BY
R. C. Winter
ATTORNEY

United States Patent Office 3,098,997

Patented July 23, 1963

3,098,997

INFORMATION STORAGE ARRANGEMENT

Winthrop J. Means, Summit, N.J., assignor to Bell Telephone Laboratories, Incorporated, New York, N.Y., a corporation of New York Filed May 28, 1959, Ser. No. 816,550
15 Claims. (Cl. 340—173)

This invention relates to apparatus for storing binary information and more particularly to such apparatus employing capacitors as the information storage medium.

Various arrangements are known in the art providing for the storage of information. Such storage is necessary in systems which require the mechanical processing of information or in systems such as the telephone system which require that particular information be retained for an indefinite period of time. Certain uses of information storage devices require that the information be stored permanently without deterioration of the stored information. On the other hand, when such information is to be stored, or it is desired to change the information, as by removing it and storing other information, the storage arrangement should readily permit such an operation.

Various attempts have been made to provide essentially permanent storage of information while permitting the change of such information if desired. Priorly known arrangements which employ capacitors as information storage devices have depended upon the charge condition of the capacitor to represent the stored information. Such information storage cannot be permanent since, despite all efforts to prevent it, the charge on the capacitor eventually leaks off. Arrangements which circumvent this disadvantage by periodically restoring the original state of the capacitor necessarily complicate the combination.

In accordance with the basic concept of employing selectively positioned capacitors as the information storage medium, as disclosed in E. R. Kretzmer application, Serial No. 816,451, filed May 28, 1959, and allowed on January 21, 1963, these disadvantages are overcome. The cited application discloses an information storage arrangement which, rather than representing information by the charge condition of a capacitor, employs a plurailty of capacitors in which the position of the capacitors relative to particular row and column conductors of a matrix array represents the stored information. Since the capacitors are fixed in a dielectric sheet, the storage of information is essentially permanent. When the information is to be changed, however, the dielectric sheet is removed and another one containing the new information is substituted.

It is an object of this invention to provide an improved arrangement for storing information on a substantially permanent basis.

It is another object of this invention to provide such an arrangement which is simple and reliable in operation and economical to produce.

More specifically, it is an object of this invention to provide for readily changing a small segment of the stored information in a capacitor matrix without requiring that the information storage medium of an entire matrix be replaced.

These and other objects of this invention are achieved in one specific embodiment thereof in which a number of conducting plates, each having a plurality of regularly spaced holes therein, are employed. These plates are electrically insulated from each other and are positioned in adjacent parallel planes with the corresponding holes in alignment. Small conducting rods having individual electrical connections to external circuitry are provided for threading the aligned groups of holes. The rods are surrounded by cylinders of a material exhibiting a high dielectric constant at predetermined positions along their length in accordance with the particular information which is to be stored. This combination defines an information storage matrix in which the plates represent column electrodes and the rods represent row electrodes.

The capacitive couplings between the respective plates and rods, provided by the appearance in selected plate apertures of dielectric cylinders on the rods, represent one particular binary digit, such as a binary "1." The other binary digit is then represented by the relatively negligible capacitive couplings between the plates and the rods which occur in these plate apertures which do not contain dielectric cylinders on the rods. In the described embodiments of the invention the existence of capacitive coupling has been chosen to designate a binary digit "1" while the lack of capacitive coupling represents a binary digit "0."

In a second specific embodiment of this invention, the conducting rods inserted in the conducting plate apertures comprise sections of different diameters to provide a selective pattern of different degrees of capacitive coupling between the rod sections and the respective apertured plates. The conducting rods may be precisely positioned within the appertures so as to prevent their making electrical contact with the plates. Alternatively, the rods may be coated with a thin insulating layer for the same reason.

Since each rod corresponds to a row of the matrix, the information stored by the selective positioning of the capacitive couplings on a particular rod comprises a plural digit binary number or word. It can be readily seen that this invention admits of the change of information stored in the matrix on a word-at-a-time basis by the simple replacement of one rod by another. Each rod may be readily slipped in and out of the selected row of aligned holes, since electrical connection thereto advantageously is provided by means of a spring jack.

Between each adjacent pair of apertured plates an additional conducting plate, similarly apertured, is provided and connected to ground. These grounded plates are inserted to eliminate undesired stray couplings between conductors of the matrix.

It is a feature of this invention that capacitive couplings be selectively provided between each plate of a plurality of parallel conductive plates and a conducting rod threading aligned apertures in the plates.

It is a feature of one specific embodiment of this invention that the selectively positioned capacitive couplings in the plate apertures be provided by cylinders of a material exhibiting a high dielectric constant affixed to the rod.

It is a feature of a second specific embodiment of this invention that the selectively positioned capacitive couplings in the plate apertures be provided by sections of the rod having different diameters to establish different spacings between the rod and the corresponding plates.

An additional feature of this invention is that grounded conducting plates be interleaved with the plates representing the matrix row conductors to prevent undesired capacitive couplings.

A complete understanding of this invention and of these and various other features thereof may be gained from consideration of the following detailed description and the accompanying drawing, in which.

Figures 1, 2:
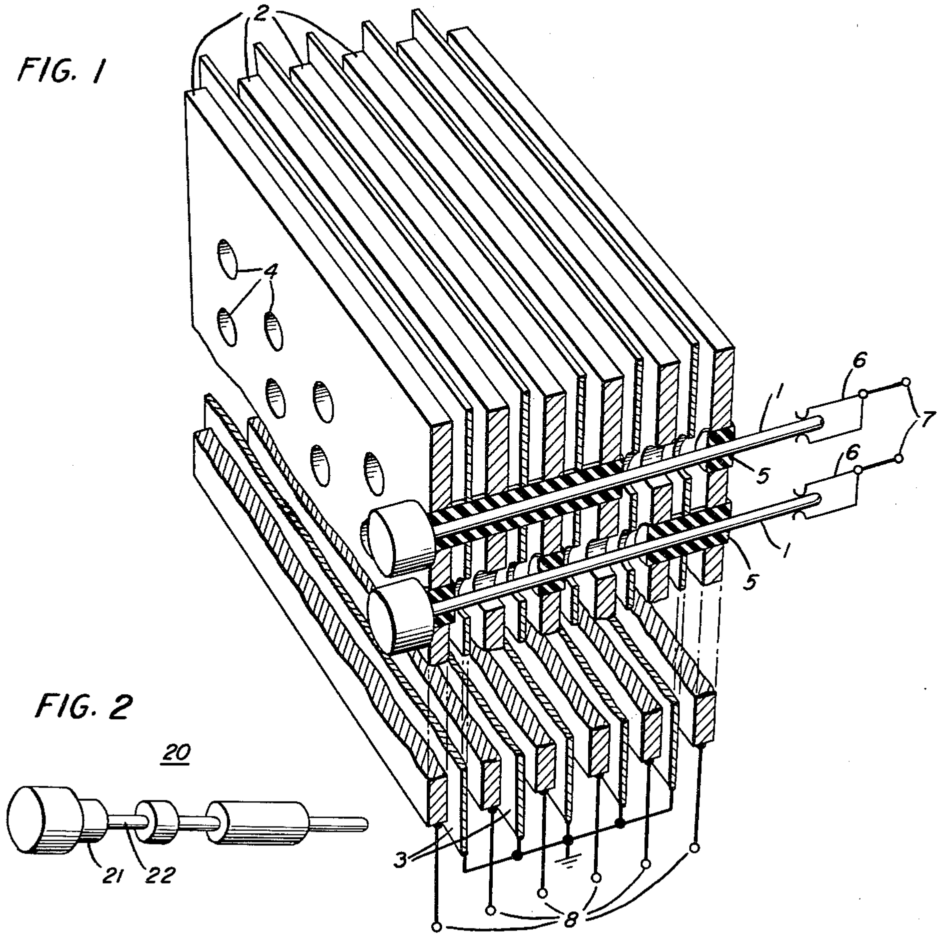
FIG. 1 is a pictorial representation of an information storage system including a capacitive matrix in accordance with one embodiment of this invention, the representation being cut away to depict a portion thereof more clearly.
FIG. 2 is a view of an element for use in the structure shown in FIG. 1 in accordance with another specific embodiment of the invention.

In FIG. 1 a plurality of conducting plates 2 are shown stacked parallel to each other. Interleaved with each pair of adjacent plates 2 is a second conducting plate 3. Each of the plates 2 and 3 is perforated with a plurality of apertures 4. The plates 2 and 3 are positioned so that the corresponding apertures 4 of each plate are aligned to permit the insertion of a conducting rod 1. Cylinders of a material having a high dielectric constant, herein referred to as a dielectric cylinder, such as the cylinders 5, are selectively positioned along the rods 1.

In the figure the depicted apparatus is shown cut away at the location of two of the rods 1 in their respective holes to show the dielectric cylinders in cross-section. Connected to each rod 1 by a spring jack attachment 6 is a readout terminal 7. Output terminals 8 are individually connected to the plates 2 which correspond to the column electrodes of the storage matrix.

Wherever a dielectric cylinder 5 is positioned along the rod 1 in a plate aperture 4, there is provided a capacitive coupling between the rod and plate. The existence of this capacitive coupling corresponds to the storage of a binary "1" at that position. Where no cylinder is provided on a rod 1 at a position opposite a plate 2 the only capacitive coupling between rod and plate is through the air occupying that space. Since the dielectric constant of the material selected for cylinder 5 is much higher than that of air, the capacitive coupling existing in the absence of a cylinder 5 is negligible by comparison. The absence of a cylinder 5 in a plate aperture 4 corresponds to the storage of a binary "0" at that point.

In FIG. 2, which depicts a portion of a second specific embodiment of this invention, there is shown a conductive rod 20 having sections of different diameter along its length. For example, the section 21 is shown having a diameter slightly less than the diameter of the aperture 4 in a plate 2 of FIG. 1. The section 22 has a substantially smaller diameter, approximately equal to that of the rod 1 of FIG. 1. The rod 20 of FIG. 2, when placed within the apertures of the plates 2 of FIG. 1, establishes different degrees of capacitive coupling between itself and the plates 2 by providing different spacings in the apertures between the respective plates 2 and the sections 21 and 22 of the rod 20. With this rod as shown, it is desirable that the rod and plates be accurately positioned with respect to each other to avoid electrical contact between them. However, the rod 20 advantageously may be coated with a thin insulating layer to prevent shorting out the capacitive couplings.

Figure 3:
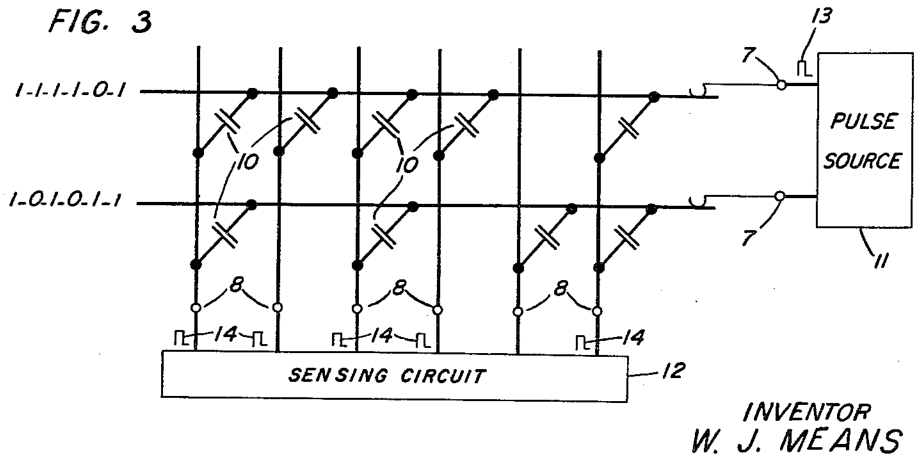
FIG. 3 is a schematic representation of a section of the system depicted in FIG. 1.

FIG. 3 represents schematically the portion of the apparatus of FIG. 1 which is represented by the depicted rods 1 and the plates 2. A plurality of capacitors 10 are shown connected at particular row and column conductor intersections in accordance with the location of the dielectric cylinders 5 on the rods 1. A pulse source 11 is connected to the terminals 7 while a sensing circuit 12 is connected to the terminals 8. Looking at FIG. 1, it can be seen that a dielectric cylinder is provided in each plate aperture threaded by the upper rod 1 except at the position of the fifth plate from the left. This rod is thus coded to represent the binary word 111101. Similarly, the lower rod 1 has dielectric cylinders 5 at all positions except in apertures of the second and fourth plates 2 from the left. This corresponds to the binary word 101011.

In the operation of this invention, the conducting rods either surrounded with dielectric cylinders 5 or having different sections 21 and 22 of different diameters, represent particular binary words stored in the aligned holes 4 in the arrangement of FIG. 1. Since in the depicted arrangement there are six plates 2 corresponding to column electrodes of a matrix, each binary word, represented by a particular rod 1 or 20 corresponding to a row electrode of the matrix, consists of six digits. This permits $2^6$ or 64 distinct combinations in which the rods may be encoded, any one of which may be replaced without changing the information stored elsewhere in the matrix.

To read out the information stored in the arrangement the matrix is pulsed on a word-at-a-time basis by selectively applying pulses to the terminals 7 from the pulse source 11. The application of a pulse at a terminal 7 produces corresponding pulses at those terminals 8 which are coupled through the capacitive couplings to the pulsed rod. The pulse appearing at a terminal 8 which is not so coupled is of negligible amplitude by comparison, and it is detected by suitable sensing circuitry as a binary "0." In FIG. 3 a pulse 13 is shown applied to the upper row of the matrix. This produces a pulse 14 at each column electrode except the fifth from the left. These pulses 14 correspond to the binary word 111101 which is stored at that level of the matrix.

Thus it can be seen that a simple but effective arrangement is provided for permanently storing binary information. However, alteration of the stored information may be accomplished by simply removing a rod from the matrix and replacing it with another such rod coded to represent the new information.

In the description of this invention, reference has been made to apertured conducting plates corresponding to the column electrodes of a storage matrix. Without departing from the scope of this invention, these plates may be fabricated in accordance with techniques known in the printed circuitry art. Advantageously, the plates may comprise cards on which conductors are deposited. The conducting interior surface of the described apertures may be provided in the cards by inserting hollow cylinders therein in contact with the deposited conductors, for example, or by other known methods. Thus the equivalent of the conducting plates may be realized by employing insulating cards with conductors thereon.

It is to be understood that the above-described arrangements are illustrative of the principles of the invention. Numerous other arrangements may be devised by those skilled in the art without departing from the spirit and scope of the invention.

What is claimed is:

1. A capacitive storage matrix comprising a plurality of conducting plates arranged in a parallel configuration, each of said plates having a plurality of apertures therein, the apertures of each plate being aligned with corresponding apertures in the other said plates, and means for providing capacitive couplings at preselected ones of said apertures corresponding to the information to be stored thereat, said last-mentioned means comprising removable members of equal length each threading a corresponding group of said apertures.

2. A capacitive storage matrix in accordance with claim 1 wherein each of said members comprises a conductive rod and a plurality of annular portions of a material exhibiting a high dielectric constant selectively positioned along said conductive rod.

3. A capacitive storage matrix in accordance with claim 1 wherein each of said members comprises a conductive rod having different diameter sections selectively positioned with respect to said conducting plates.

4. A capacitive storage matrix in accordance with claim 3 further comprising an insulating coating on said members.

5. An information storage circuit comprising a plurality of conductive members insulated from each other and each having a plurality of apertures therein, the apertures in each of said members being aligned with apertures in the other of said members, and means for storing information at selected ones of said apertures by defining capacitances thereat coupled to said conductive members, said information storing means comprising conductive rods of equal length removably positioned in said aligned apertures and having enlarged portions thereon in said apertures adjacent individual of said conductive members.

6. An information storage circuit in accordance with claim 5 wherein said enlarged portions are of a material having a high dielectric constant, whereby capacitive coupling defining the storage of information only exists between a conductive member and a conductive rod at an aperture encompassing said dielectric material on one of said rods.

7. An information storage circuit in accordance with claim 5 wherein said enlarged portions are conductive, whereby capacitive coupling defining the storage of information only exists between a conductive member and a conductive rod at an aperture encompassing said enlarged conductive portion on one of said rods.

8. An information storage circuit in accordance with claim 5 wherein said conductive members comprise apertured conductive sheets.

9. An information storage circuit in accordance with claim 8 further comprising shielding means between adjacent of said conductive sheets, said shielding means comprising second apertured conductive sheets and means connecting said second sheets to ground.

10. A circuit for storing information by means of selectively located capacitive couplings comprising a first plurality of apertured plates at least partly of a conducting material spaced apart in parallel planes with their corresponding apertures in alignment, and means for providing capacitive couplings in the apertures of selected ones of said plates of said first plurality, said last-mentioned means comprising a plurality of interchangeable conducting rods of equal length threading the centers of said aligned apertures and comprising cylinders of a material having a high permittivity relative to that of air selectively positioned on each of said rods.

11. A circuit in accordance with claim 10 further comprising means connected to said rods and plates for reading out stored information.

12. A circuit in accordance with claim 11 wherein said last-mentioned means comprises a signal source connected to said rods for applying an interrogation signal to a selected one of said rods and sensing means connected to said apertured plates for detecting the existence of capacitive couplings between said plates and said selected rod.

13. A circuit in accordance with claim 10 further comprising means for blocking spurious pulses between adjacent apertured plates of said first plurality, said last-mentioned means comprising a second plurality of apertured plates of a conducting material connected to ground and individually positioned between adjacent plates of said first plurality.

14. A circuit for the storage and readout of information by means of selectively located capacitive couplings comprising a plurality of apertured plates at least partly of a conducting material, said plates being arranged adjacent one another with their corresponding apertures in alignment, means comprising a plurality of interchangeable conducting rods of equal length threading the centers of said aligned apertures, means for providing capacitive couplings between said conducting rods and selected ones of said plates of said first plurality, said last-mentioned means comprising segments of different diameters selectively positioned along said conducting rods, and comprising means for applying readout signals to said conducting rods, and comprising means connected to said apertured plates for detecting the existence of capacitive couplings between said plates and a conducting rod to which a readout signal is applied.

15. A circuit in accordance with claim 14 further comprising means for blocking spurious pulses between adjacent plates of said first plurality, said last-mentioned means comprising a second plurality of apertured plates of a conducting material connected to ground and individually arranged between adjacent plates of said first plurality.

References Cited in the file of this patent

UNITED STATES PATENTS

| | | |
|---|---|---|
| 1,235,515 | Chrisman | July 31, 1917 |
| 2,006,436 | Bowers | July 2, 1935 |
| 2,460,107 | Slade | Jan. 25, 1949 |
| 2,594,595 | Stearns | Apr. 29, 1952 |
| 2,724,819 | Peterson | Nov. 22, 1955 |
| 2,758,268 | Peysson | Aug. 7, 1956 |
| 2,900,597 | Gooding | Aug. 18, 1959 |